Figure 1:
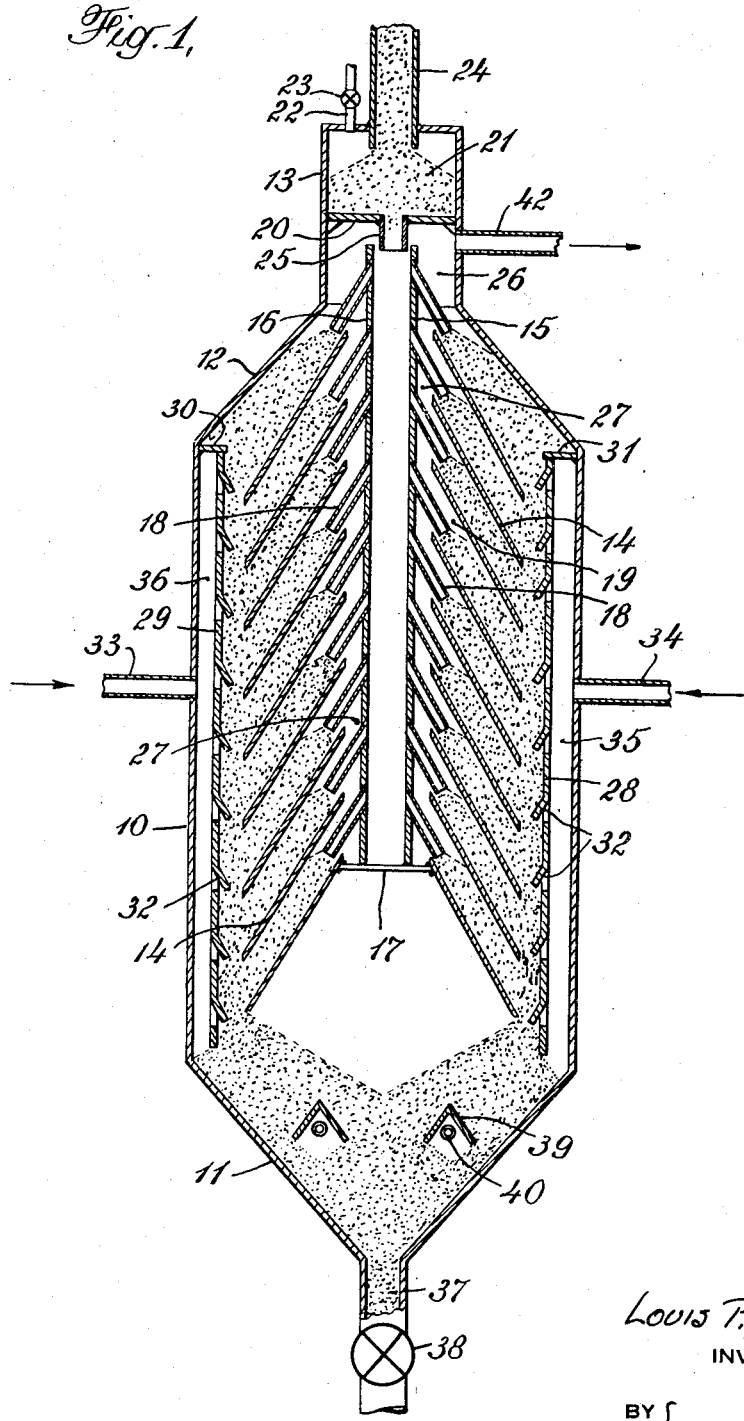

Nov. 15, 1949     L. P. EVANS     2,488,493
APPARATUS FOR CONDUCTING GAS-SOLID CONTACT OPERATIONS
Filed June 21, 1944     2 Sheets-Sheet 1

LOUIS P. EVANS
INVENTOR

BY
ATTORNEY

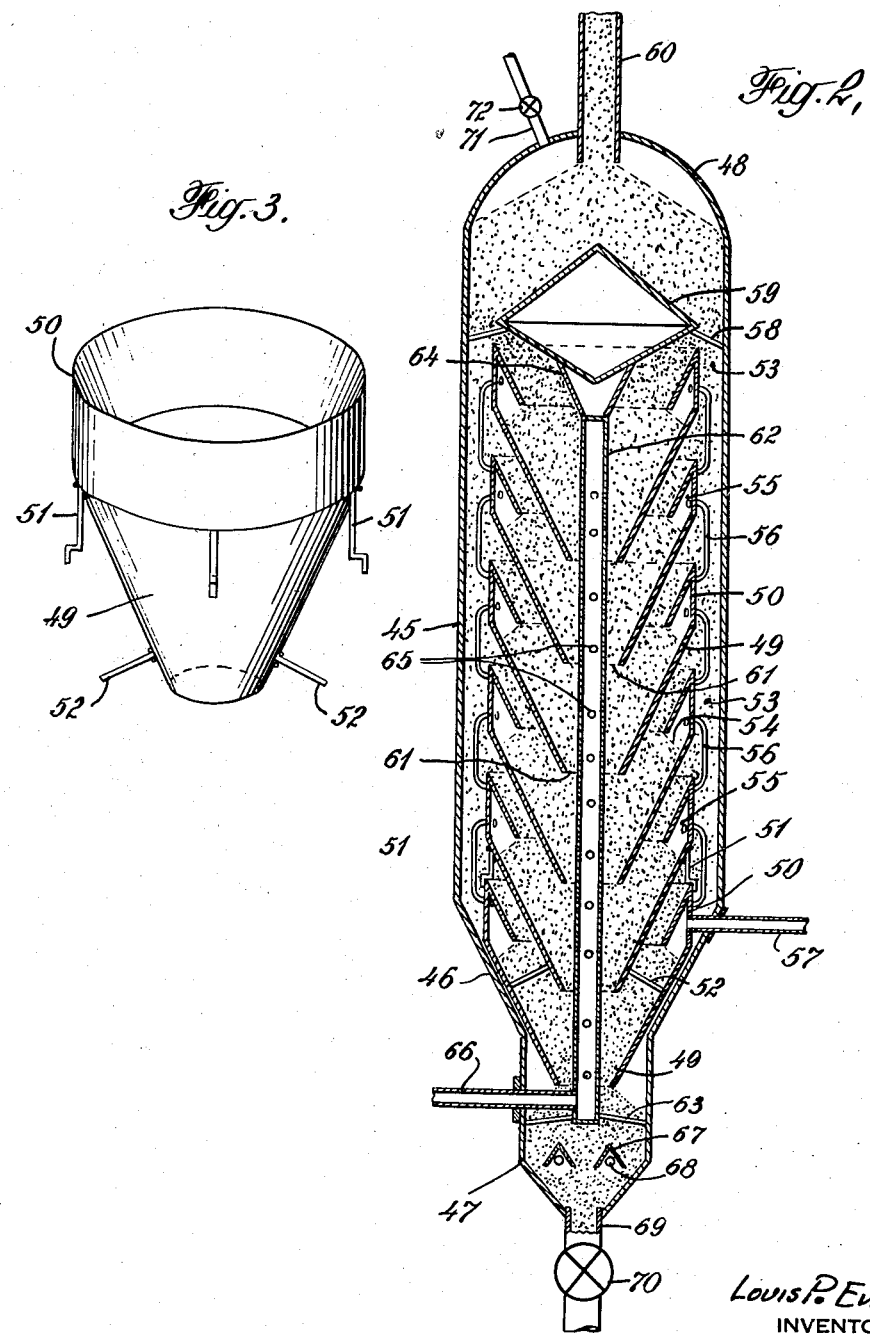

Patented Nov. 15, 1949

2,488,493

UNITED STATES PATENT OFFICE 2,488,493

APPARATUS FOR CONDUCTING GAS-SOLID CONTACT OPERATIONS

Louis P. Evans, Woodbury, N. J., assignor to Socony-Vacuum Oil Company, Incorporated, a corporation of New York Application June 21, 1944, Serial No. 541,427

12 Claims. (Cl. 23—288)

This invention relates to processes wherein gases are contacted with particle form solid material for any of a number of purposes such as, solid material treatment, gas adsorption, gas separation, gas treatment or catalytic gaseous conversion. The invention is especially directed toward gaseous conversion processes such as the catalytic reforming, isomerization, polymerization, cracking, hydrogenation, dehydrogenation and desulfurization of hydrocarbons. Typical of such processes is the catalytic cracking conversion of hydrocarbons, it being well known that gas oils boiling in the range of 500° F. to 750° F. may be converted to gasoline, gas and other products when passed over a particle form solid adsorbent material at controlled conditions of temperature such as, for example, 800° F. and higher, and pressures, usually above atmospheric. The particle form solid contact mass material may partake of the nature of natural or treated clays, such as fuller's earth, Superfiltrol or bauxite or of various synthetic associations of alumina, silica, or alumina and silica, any of which may or may not have other constituents added such as certain metallic oxides. In a most recent form, this operation has been developed as one in which the particle form solid contact mass material is moved cyclically through two zones in the first of which it is subjected to gaseous reaction and in the second of which it is subjected to the action of a fluid regeneration medium, such as air, acting to burn off contaminant materials deposited upon the contact mass during the gaseous reaction.

This invention has specifically to do with the construction of a reactor wherein vaporous reactants are brought into contact with a substantially compact moving mass of particle form solid contact mass material. In one form of reactor heretofore used, the solid material is passed through an elongated reaction vessel as a substantially compact continuous column of downwardly moving particle form solid material. Gaseous reactants are passed through the length of said column either concurrently or counter-currently to the direction of solid material flow. A second type of reactor which will permit substantially greater reactant gas throughput rates without disruption of the solid material flow involves passing the solid material downwardly through a series of superimposed short reaction stages and passing the gas in parallel through the several reaction stages. Since in many operations the catalytic activity of the solid material gradually decreases as it passes through the several superimposed reaction stages, due to contaminant deposition thereon, the yield and property of gaseous conversion products formed in the several parallel stages is not uniform. Thus the properties of the gasoline formed in the last of a series of such parallel stages in a hydrocarbon cracking operation may be markedly inferior to that of the gasoline product from the first of said series of stages. Such a result constitutes a decided disadvantage to such an operation.

A major object of this invention is the provision in a process wherein vaporous reactants are contacted with a moving substantially compact mass of particle form solid material for the purpose of conversion, of an apparatus wherein advantage may be taken of the relatively high permissible gas throughput rates obtainable by passage of reactant gases in parallel through a number of superposed reaction zones, while at the same time maintaining uniformity of yields and properties of the gaseous conversion products from all of said zones.

Another object of this invention is the provision of an apparatus for contacting gas with a moving stream of particle form solid material, wherein substantial uniformity of the solid material contacting efficiency is maintained in the various levels of the contacting apparatus.

Still another object of this invention is the provision of an apparatus for catalytic conversion of hydrocarbons wherein both gaseous reactants and particle form solid contact mass material may be passed in parallel through a plurality of conversion zones housed within the same conversion vessel.

These and other objects will become apparent from the following description of this invention. The apparatus herein disclosed involves the provision within a single vertical vessel of a plurality of conversion zones so arranged as to cause the solid material to flow in parallel therethrough in a generally diagonally or downwardly sloping direction rather than in a totally vertical direction and as to cause the vaporous reactants to pass upwardly through the conversion zones in an upwardly sloping direction. A better understanding of the apparatus may be obtained by reference to the drawings attached hereto in which drawings Figure 1 is an elevational view, partially in section, of a preferred form of the apparatus of this invention. Figure 2 is an elevational view, partially in section, of a modified form of the apparatus, and Figure 3 is an isometric view of one of the baffles used in the apparatus of Figure 2. All of these drawings are highly diagrammatic in form.

Turning now to Figure 1, we find 10 is the shell of a vertical vessel closed at its lower end by a tapered drain section 11, and at its upper end by the tapered section 12 and the head section 13 of reduced cross-sectional area. The vessel is intended to be generally rectangular in cross-sectional shape, as shown, but may take other shapes in other modifications. Positioned within the intermediate vertical section of the vessel are two side by side vertical rows of vertically spaced downwardly sloping baffles 14, extending lengthwise entirely across the vessel in the direction perpendicular to the plane of the drawing, the baffles in each row being spaced one above the other and supported on their extreme ends by suitable means from the walls of the vessel lying in the plane parallel to that of the drawing. The two vertical rows of baffles are spaced apart and the baffles are sufficiently limited in width so as to leave vertical open spaces through the vessel adjacent the upper and lower ends of the sloping baffles. The arrangement thus provides two series of downwardly sloping passages or conversion zones for solid material flow, having common solid material inlet and outlet passages as hereinafter shown. Two spaced vertical partitions 15 and 16 are positioned within the vertical open space adjacent the upper ends of the sloping baffles and between the two vertical rows of baffles, and these partitions extend upwardly into the upper section of the vessel above the baffles. These partitions also extend across the vessel in a direction perpendicular to the plane of the drawing and are supported similarly to the sloping baffles. The partitions are so spaced as to provide a confined inlet passage for solid material flow extending partly across the width of the vertical space adjacent the upper ends of the sloping baffles. The passage so formed and the entire vertical space is blocked off from the lower section of the vessel below the baffles by means of plate 17 attached across the lowermost baffles. Downwardly sloping pipes 18 are connected into the partitions at the level of the sloping passages for solid material flow provided between the sloping baffles, and the pipes extend a short distance down said passages so as to provide a gas space at the upper end of each passage from which solid material is substantially deflected. Several such inlet pipes spaced horizontally apart may be provided for each sloping passage. Vertical partitions 28 and 29 are supported at their opposite ends within the vertical spaces adjacent the lower ends of the two vertical rows of sloping baffles, the partitions being so positioned as to provide an inlet gas distribution space between each partition and the vessel wall, while still leaving a vertical open space through the intermediate vertical section of the vessel and adjacent the lower ends of said sloping baffles for downward flow of solid material from the sloping passages into the lower section of said vessel below said sloping baffles. Louvers 32 are provided along the partitions 28 and 29, the louvers being of such construction as will permit free flow of gas therethrough into the solid material while preventing flow of solid material therethrough into the gas distribution spaces 35 and 36. Gas inlet conduits 33 and 34 are connected through the vessel shell adjacent the gas distribution spaces 36 and 35, respectively, and members 30 and 31 are connected across the upper ends of said spaces within the vessel to prevent flow of solid material thereinto. Referring now to the upper section of the vessel, which is as shown of reduced cross-section, a partition 20 is supported thereacross so as to provide a seal chamber 21 in the upper end thereof. A pipe 22 with valve 23 thereon is connected into the top of the seal chamber 21 for admittance of seal gas, and a conduit 24 is connected thereinto for admittance of particle form solid contact material. A pipe 25 depends from partition 20 and extends downwardly into the upper end of the passageway provided between partitions 15 and 16. This pipe provides a passage for solid material into said passageway, and, if desired, several such pipes may be provided. By the arrangement above described, a gas outlet space 26 is automatically provided below the partition 20. This gas space is in free communication with the hereinbefore described vertical gas space 27, which is in turn in free communication with each of the gas disengaging or collecting spaces 19, provided, as above described, at the upper end of each sloping passage or conversion zones. A gas outlet conduit 42 is connected through the vessel shell adjacent the gas space 26. Considering now the drain section 11 at the lower end of the vessel, inverted angle shaped hoods 39 are positioned therein for distribution of a purge gas into the solid material. These angles may be supported at their opposite ends from the drain section shell. Inlet pipes 40 are connected through the vessel shell and extend under the angles 39 for gas inlet. A conduit 37 having a throttle valve 38 thereon is connected into the lower end of the drain section for solid material outlet.

Considering now the operation of the above described apparatus, as applied to an exemplary process, such of the catalytic conversion of hydrocarbons, fresh particle form solid contact mass material passes into the seal zone 21 against the gaseous pressure maintained therein and then passes through pipes 25 into the vertical passage provided between partitions 15 and 16. The solid material is distributed from this passage by pipes 18 into the upper ends of the downwardly sloping passages provided between the sloping baffles 14. The solid material flows in parallel through said sloping passages and passes therefrom into the common vertical drain passage provided between the louvered gas inlet partitions and the lower ends of the sloping baffles. The spent solid material passes downwardly through these vertical passages into the drain section 11 where it is contacted with an inert purge gas for purpose of removing reactant vapors. It then passes from the vessel through conduit 37, the rate of outflow being throttled by valve 38 so as to maintain the passages for solid material flow through the vessel substantially filled therewith. The spent solid material may be then passed through a regeneration vessel (not shown) after which it may be returned to the top of the conversion vessel. Hydrocarbon charge is heated to the desired conversion temperature in a suitable furnace (not shown) which may be of conventional design, and the vaporous hydrocarbons then pass into the vessel through conduits 33 and 34. The vapors distribute themselves in the gas spaces 35 and 36 and pass through the louvered openings in the partitions 28 and 29, through the solid material passing through the common vertical drain spaces and then in an upwardly sloping direction through the sloping conversion zones between baffles 14. The vaporous reaction products disengage from the solid material at the upper ends of said sloping zones, entering gas spaces 19 and thence upwardly through the vertical gas space 27 between the pipes 18 into the outlet gas space 26. Entrained solid material particles may separate from the effluent vapor stream in the gas space 26, and the vapors then pass from the vessel through conduit 42. The vapors may then be conducted to a suitable product recovery system, (not shown). An inert purge gas, such as steam or flue gas, may be introduced through pipes 40 under distribution hoods 39. This gas then passes upwardly through the solid material purging entrained hydrocarbon vapors therefrom and passes from the system along with the vaporous conversion products. An inert seal gas is introduced through pipe 22 into the seal chamber 21, the rate of introduction being controlled so as to permit maintenance of a seal gas pressure in chamber 21 equal to or greater than the pressure in outlet gas space 26. Thus the loss of reactant vapors from either end of the vessel is substantially prevented.

The apparatus, above described, may be modified in several particulars. Thus instead of louvered partitions 28 and 29, partitions constructed substantially of small mesh screen or perforated conduits may be substituted for inlet vapor distribution into the plurality of downwardly sloping conversion zones. Also in place of partitions 15 and 16 and pipes 18 for distribution of inlet solid material into the conversion zones, a number of vertical pipes with individual feed pipes similar to pipes 18 may be substituted. In some operations wherein the operating pressure is substantially atmospheric or wherein the escape of some reactant vapor through the solid material inlet and outlet conduits is not objectionable, the means for purging the solid material in the drain section 11 and the seal chamber 21 may be entirely omitted. The invention is not limited to the use of two side by side vertical series of superimposed conversion zones. In fact one, two or several such vertical series of conversion zones may be provided within a single conversion vessel. When several such vertical series are provided, adjacent series will share common gas distribution means and common solid material distribution means located therebetween.

The arrangement and construction of the baffles defining the sloping conversion zones may also be modified. Thus in Figure 2, is shown a modified baffle installation particularly well adapted for vessels of circular cross-sectional shape. Thus, in Figure 2 we find a substantially vertical vessel 45 of circular cross-section, closed on its lower end by conical section 46 and drain section 47 of reduced cross-section, and on its upper end by rounded dome 48. Resting upon the conical section 46 within said vessel is the inverted hollow truncated conical baffle 49 having one side of an inverted angle shaped baffle 50 welded along its upper edge. The baffle 50 will be further described hereinafter. Spaced above and supported upon the baffle 49 by suitable braces 51 is another similar baffle unit comprising a truncated conical baffle with angle baffles along its upper edge. A series of similar units are stacked one above the other extending through a major vertical section of the vessel; each unit being spaced from and supported upon the one below by brace rods 51, which are only shown between the two lowermost baffle units for the purpose of simplicity of drawing. Additional brace rods 52 are welded to the lower section of each conical baffle as a means of lateral support. The baffle units are so spaced one above the other as to provide a plurality of superimposed downwardly sloping passages or zones for solid material flow therebetween having a common vertical annular shaped open space 53 between the upper edges of the baffles and the vessel shell for flow of inlet solid material and a common open central vertical space extending through the openings in the lower ends of said conical baffles for flow of outlet solid material from the sloping conversion zones to the drain section 47 at the lower end of the vessel. The inverted angle baffles 50 are welded along the upper edge of the conical baffles so that one side of each of said baffles 50 extends inwardly into the sloping passages or zones between conical baffles, thereby serving to so deflect the flow of inlet solid material from space 53 into the sloping passages or zones as to provide a solid material excluded gas space at the upper end of each of said sloping passages which is in free gaseous communication with the solid material along the open space 54 under the baffles 50. These gas spaces 55, so provided, are interconnected by means of pipes or tubes 56 connected between vertically adjacent baffles, and a gas outlet conduit 57 is connected through the vessel shell into the lowermost baffle 50 so as to provide a gas outlet passage from the spaces 55. If desired, several outlet conduits similar to 57 may be provided at various levels within the vessel. Supported by brace members 58 from the shell in the upper section of the vessel above the conical baffles is a large baffle member 59 comprising an upright and an inverted cone connected together at their bases. The baffle 59 serves to deflect the flow of solid material entering through a conduit 60 in the top of the vessel into the annular shaped vertical catalyst inlet passage 53 and to substantially prevent its direct flow through the vertical central open space 61. Supported within said central space 61 but not occupying the entire cross-section thereof is the vertical conduit 62 which extends vertically essentially through that vertical portion of the vessel occupied by the sloping conversion zones. The conduit 62 is thus supported by sets of brace rods 63 and 64. Small orifices 65, generally smaller than the particle size of the solid material to be used, are spaced along the conduit 62, and an inlet conduit 66 is connected into the lower end of conduit 62. Within the lower section of the vessel, hooded members 67 are supported by suitable means (not shown) across the drain section 47 for distribution of purge gas, and gas inlet pipes 68 are provided thereunder. A drain conduit 69, having throttle valve 70 thereon is provided at the lower end of the drain section.

A better understanding of the construction of the truncated conical baffles 49 with angle baffles 50 attached thereto may be obtained by reference to Figure 3, which is an isometric view of such a unit, all like members in Figures 2 and 3 bearing like numerals.

Returning again to Figure 2 for a study of the operation, particle form solid material is introduced into the upper end of the vessel through conduit 60 and is deflected by baffle 59 so as to flow downwardly through annular passage 53. This passage is blocked at its lower end by the lowermost baffle unit so that the solid material flows in parallel through the series of superimposed downwardly sloping conversion zones between the baffle units 49—50, and passes therefrom into the common central drain space 61 and then downwardly into the drain section 47 wherein it is contacted with inert purge gas entering through pipes 68 and distributed by angle baffles 67. The solid material then passes from the vessel through outlet conduit 69 and flow throttle valve 70. Reactant vapors pass through conduit 66 into distribution conduit 62, thence through perforations therein, into the solid material and then in parallel through the series of superimposed sloping conversion zones countercurrently to the solid material flow. The vaporous reactant products disengage from the solid materials at surfaces 54 under the baffles 50 at the upper ends of the conversion passages and then enter the gas spaces from which they are withdrawn through pipes 56 and the main outlet conduit 57. An inert seal gas is admitted into the top of the vessel through pipe 71 at such a rate as to maintain a seal gas pressure in the upper end of said vessel above that in the conversion zones therebelow. It will be noted that with the apparatus construction shown in Figure 2, no partitions are required to define a separate seal chamber in the upper end of the vessel.

The apparatus construction shown in either of the above modifications is characterized in the provision of a plurality of superimposed downwardly sloping conversion zones within a single vessel. The provision of such sloping conversion zones makes possible an apparatus wherein the solid material as well as the reactant gas may be passed in parallel through a series of relatively short conversion zones without the requirement of a separate vessel for each conversion zone and without the complex piping and manifolding for gas and solid material inlet and outlet and without the plurality of seal and urge zones that would be required in a process involving a plurality of such separate conversion vessels. In the apparatus of this invention a very simple, practical and economical means for distributing vapors to and disengaging vapors from the particle form solid material is employed and the number of required vapor inlets and outlets to and from the conversion vessel is substantially less than the number of parallel conversion zones provided. Moreover, the apparatus in permitting the parallel flow of vapors through relatively short columns of particle form solid material in a plurality of conversion zones and in providing parallel flow of solid material flow through said zones, not only provides the very high vapor throughput capacities characteristic of multistage vapor flow operations, but also provides solid contact mass material of substantially the same catalytic activity and temperature in every conversion zone. Consequently, the quality and yield of conversion products, such as gasoline, obtained from all the conversion chambers will be substantially the same, thereby entirely overcoming the major disadvantage of multistage gas flow operation. Thus when using the apparatus of this invention, no segregation and separate handling of the conversion products from the various conversion zones is required, the products being combined and handled together in a single product recovery system. These advantages have been accomplished without any multiplication of the number of solid material feed and drain zones. Only a single solid material feed chamber, serving also as a seal chamber, is provided above in several reaction zones, and only a single drain chamber, serving also as a seal and urging chamber, is provided below the several conversion zones.

Any number of superimposed reaction zones or side by side vertical rows of such superimposed zones may be provided depending upon the nature of the reaction involved and the height and cross-section of the conversion vessel. Generally, the required length of path for vapor flow through the sloping conversion zones may vary depending upon the particular operation involved. Thus for processes involving catalytic cracking of petroleum gas oils, the sloping baffles should be sufficiently long to provide a path length for vapor flow through the solid material of the order of 1 to 5 feet. The required vapor throughput rates are, of course, inherent for any given reaction and the maximum allowable linear rate of vapor flow is dependent upon the type, size and density of the solid material as well as upon the properties of the reactant gas and the reaction temperature and pressure. In general, the maximum linear rate of vapor flow in any reaction chamber should be limited below that which would cause serious boiling of the particle form solid material or disruption of its downward flow, and the number of conversion zones and the cross-section for vapor flow therein should be adjusted accordingly.

All the foregoing illustrations and description of the method and apparatus of this invention and the applications thereof are merely exemplary in character and are in no way intended to limit the scope of this invention.

I claim:

1. In an apparatus for conversion of hydrocarbon vapors in the presence of a particle form solid contact mass material a substantially vertical vessel closed on either end, a series of vertically spaced downwardly sloping baffles extending partly across said vessel so as to provide therebetween a series of superimposed downwardly sloping passages for solid material flow within said vessel, means to introduce particle form solid contact mass material into the upper ends of said sloping passages, means to withdraw solid material from the lower ends of said passages, at a throttled rate so as to cause the solid material to flow therethrough as a substantially compact mass, means to supply hydrocarbon reaction vapors to the lower ends of said sloping passages, means to disengage vaporous reaction products from said solid material at the upper ends of said passages, means to withdraw the disgaged vaporous reaction products from said vessel.

2. An apparatus according to claim 1 characterized in that said sloping baffles are positioned at an angle greater than 60 degrees with the horizontal.

3. An apparatus for conversion of hydrocarbon vapors in the presence of a particle form solid contact mass material comprising: a substantially vertical vessel closed on either end, at least one vertical row consisting of a plurality of downwardly sloping, substantially parallel baffles positioned one above the other at spaced vertical intervals within the intermediate vertical section of said vessel, said baffles extending across only a portion of said vessel cross-section so as to provide vertical spaces through said vessel adjacent the upper and lower ends of said sloping baffles, said baffles thereby providing at least one vertical row comprising a plurality of superimposed downwardly sloping substantially parallel passages for solid material flow, the sloping passages in each vertical row having a common vertical space adjacent their upper ends for flow of inlet solid material and a common vertical space adjacent their lower ends for flow of solid material therefrom into the lower section of said vessel below said baffles, means to introduce fresh particle form contact mass material to the upper section of said vessel above said baffles, solid flow directing means in the upper section of said vessel above said baffles to direct the flow of said fresh solid material into the upper end of said vertical space extending vertically adjacent the upper ends of said baffles so as to permit its flow from said vertical space into said sloping passages between said sloping baffles, a closure at the lower end of said vertical space which extends adjacent the upper ends of said sloping baffles to prevent flow of said solid material from said vertical space directly into the lower end of said vessel, means to withdraw solid material from the lower section of said vessel, throttling means associated therewith to permit regulation of the rate of solid material withdrawal, means to supply hydrocarbon reactant vapors to the lower end of each of said sloping passages, means to disengage vaporous reaction products from the solid material at the upper end of said sloping passages and means to withdraw disengaged vaporous reaction products from said vessel.

4. An apparatus according to claim 3 characterized in that said sloping baffles are positioned at an angle greater than 45 degrees with the horizontal.

5. An apparatus for conversion of hydrocarbon vapors in the presence of a particle form solid contact mass material comprising: a substantially vertical vessel closed on either end, at least one vertical row consisting of a plurality of downwardly sloping, substantially parallel baffles positioned one above the other at spaced vertical intervals within the intermediate vertical section of said vessel, said baffles extending across only a portion of said vessel cross-section so as to provide vertical spaces through said vessel adjacent the upper and lower ends of said sloping baffles, said baffles thereby providing at least one vertical row comprising a plurality of superimposed downwardly sloping substantially parallel passages for solid material flow, the sloping passages in each vertical row having a common vertical solid feed space adjacent their upper ends for flow of inlet solid material and a common vertical solid drain space adjacent their lower ends for flow of solid material therefrom into the lower section of said vessel below said baffles, means to introduce fresh particle form contact mass material to the upper section of said vessel above said baffles, members within said vessel above said baffles adapted to direct the flow of said fresh solid material into each of vertical solid feed space and to substantially exclude flow of said solid material into any vertical solid drain space except via said sloping passages, a closure on the lower end of each vertical solid feed space to prevent flow of said solid material from said vertical space directly into the lower end of said vessel, means to withdraw solid material from the lower section of said vessel, throttling means associated therewith to permit regulation of the rate of solid material withdrawal, means defining a solid material excluded gas space within each vertical solid drain space, said gas space extending substantially through that portion of the length of said vertical space which is directly opposite the lower ends of said sloping passages and said gas space being in free gaseous communication with the solid material flowing in said vertical space along the ends of said sloping passages, means to introduce vaporous hydrocarbon reactants to said gas space, members defining limited passages for solid flow into each of said sloping passages from the vertical solid feed space adjacent the upper ends of said sloping passages, said members being adapted to provide at the upper end of and communicating with said sloping passages gas disengaging spaces from which solid flow is diverted, and means to withdraw disengaged vaporous reaction products from said gas disengaging spaces.

6. In an apparatus for catalytic conversion of hydrocarbons, a substantially vertical closed vessel, within the intermediate vertical section of said vessel a plurality of sloping passage defining partitions arranged in a plurality of horizontally spaced vertical rows, each vertical row consisting of a plurality of vertically spaced apart, parallel, sloping partitions, the partitions in adjacent vertical rows sloping downwardly in opposite directions, said rows of partitions being so positioned within said vessel and so spaced as to provide a plurality of horizontally spaced vertical rows of superimposed downwardly sloping substantially parallel passages for solid material flow, the passages in adjacent rows sloping downwardly in opposite directions and the passages in any vertical row having adjacent their upper ends a common vertical space, hereinafter termed solid material feed passage and having adjacent their lower ends a common vertical space, hereinafter termed solid material drain passage which is open on its lower end to the section of said vessel below said sloping partitions, means to introduce particle form solid catalytic material to the upper section of said vessel above the level of said sloping partitions, solid flow directing members within said upper section of said vessel above said sloping partitions to direct the flow of said solid material into each solid material feed passage, baffle members near the upper ends of each of said sloping passages to divert the solid material flowing from each feed passage to each of the sloping passages adjacent thereto from a space at the upper end of each of said sloping passages and in free gaseous communication therewith, said spaces being hereinafter termed disengaging spaces, a closure member blocking the lower end of each solid material feed passage from the lower section of said vessel below said sloping partitions, solid material outlet means from the lower section of said vessel below said sloping partitions, flow throttling means associated with said outlet means, substantially vertical partitioning defining a solid material excluded gas space within each solid material drain passage, said gas space extending substantially through that portion of the length of the vertical drain passage which is directly opposite the lower ends of said sloping passages and said partitioning in each drain passage having perforations therein at intervals along the entire portion of its length which is opposite the lower ends of said sloping passages permitting free gaseous communication between said gas space and the solid material flowing in said drain passage, means to introduce vaporous hydrocarbon reactants into each of said last named gas spaces and means to withdraw vaporous reaction products from said disengaging spaces.

7. An apparatus for conversion of hydrocarbon gases in the presence of a contact mass material comprising: a substantially vertical closed cylindrical vessel, a plurality of inverted truncated conical baffles positioned at spaced vertical intervals one above the other within the intermediate vertical section of said vessel, said baffles being hollow and open on both ends and extending horizontally short of the vessel shell on their upper ends, the baffles thereby defining a plurality of superimposed downwardly sloping passages for solid material flow between said baffles, said sloping passages having adjacent their upper ends a common annular shaped passage extending through said vessel between the shell and the periphery of the upper edges of said baffles, said vertical passage, hereinafter termed a solid material feed passage, and said sloping passages having adjacent their lower ends a common central passage extending vertically through the central openings in the lower ends of said baffles and serving as a drain passage for flow of solid material from said sloping passages into the lower section of said vessel, an inlet conduit for solid particle form contact material at the upper end of said vessel, baffle means within the upper section of said vessel arranged so as to direct the flow of said solid material into said vertical annular feed passage and to block the flow of said solid material from the upper end of said central drain passage, means blocking the lower end of said vertical feed passage from the lower section of said vessel below said sloping baffles, outlet means for solid material flow from the lower section of said vessel, flow throttling means associated therewith, a substantially vertical conduit closed on either end positioned within said central drain passage and extending vertically through the intermediate section of said vessel, said conduit having a plurality of perforations along its surface of insufficient size to permit the flow of solid material particles thereinto, means to admit vaporous reactant gases to said conduit, baffling positioned along the upper edge of each of said truncated conical baffles defining a gas space from which the flow of solid material from said vertical feed passage to each of said sloping passages is deflected, said baffling being such as to provide at least one surface along each of said gas spaces for free gaseous flow between said solid material and said gas spaces, pipes interconnecting said gas spaces and an outlet conduit from at least one of said gas spaces.

8. In an apparatus of the type described a substantially vertical closed vessel, at least one vertical row of vertically spaced, parellel downwardly sloping baffles supported in the intermediate vertical section of said vessel and extending only partly across said vessel so as to leave vertical spaces through said vessel adjacent the upper and lower edges of said sloping baffles, said baffles thereby providing at least one vertical row of superimposed downwardly sloping passages for solid material flow within said vessel, the sloping passages of each vertical row being provided with a common vertical solid inlet space adjacent their upper ends and a common vertical solid outlet space adjacent their lower ends; a louvered vertical partition within each vertical solid outlet space, the louvers being such as to prevent solid particle flow therethrough while permitting free gas flow and the partition being so arranged as to define a vertical gas space extending partly across said vertical solid outlet space, a top closure at the upper end of the gas space defined by said partition; means to introduce reactant gas into the gas space in each solid outlet space, vertical passage defining means defining a vertical solid inlet header passage closed on its lower end within each vertical solid inlet space, said passage defining means extending upwardly into the upper section of said vessel above said sloping baffles and said passage defining means occupying only a portion of the cross-section of said vertical solid inlet space so as to provide in each vertical space adjacent the upper edges of the sloping baffles both a solid inlet header space and a vertical gas outlet header passage which latter passage communicates the upper end of each sloping passage; short pipes connected at an angle into said passage defining means at the levels of each of said downwardly sloping passages, said pipes extending down into said sloping passages shortly below their upper ends and serving to convey particle form solid material thereinto in such a way as to provide gas spaces for solid-gas disengagement at the upper ends of each of said sloping passages, all of said gas spaces communicating said vertical gas outlet header passage; a partition extending across said vessel within the upper section thereof defining a seal zone within the upper end of said vessel; means to introduce an inert seal gas to said seal zone; means to admit solid material to said seal zone; conduit means depending from said partition and terminating within the upper section of said vertical passage defining means for passage of inlet solid material thereto, said conduit means thereby serving to provide a solid material excluded gas accumulation space below said partition which is in free communication with said vertical gas outlet header passage; gas outlet means from said vessel adjacent said gas accumulation space; outlet means for solid material at lower end of said vessel, flow throttling means associated therewith.

9. In an apparatus for conversion of hydrocarbon vapors in the presence of a particle form solid contact mass material a substantially vertical vessel closed on either end, a series of vertically spaced downwardly sloping baffles extending partly across said vessel so as to provide therebetween a series of superimposed downwardly sloping passages for solid material flow within said vessel, members adjacent the upper ends of said sloping passages defining solid inlet passages into said sloping passages and providing gas disengaging spaces at the upper ends of said sloping passages, means to withdraw solid material from the lower ends of said passages and flow throttle means associated with said withdrawal means, and passage defining means communicating each of said gas disengaging spaces for flow of gas therefrom.

10. An apparatus for conversion of hydrocarbon vapors in the presence of a particle form solid contact mass material comprising: a substantially vertically vessel closed on either end, at least one vertical row consisting of a plurality of downwardly sloping, substantially parallel baffles positioned one above the other at spaced vertical intervals within the intermediate vertical section of said vessel, said baffles extending across only a portion of said vessel cross-section so as to provide vertical spaces through said vessel adjacent the upper and lower ends of said sloping baffles, said baffles thereby providing at least one vertical row comprising a plurality of superimposed downwardly sloping substantially parallel passages for solid material flow the sloping passages in each vertical row having a common vertical solid inlet passage adjacent their upper ends which vertical passage is closed on its lower end to prevent flow of solid therefrom into a lower section of said vessel below said sloping baffles and said sloping passages in each vertical row also having a common vertical solid drain passage adjacent their lower ends for receiving solid flow from said sloping passages, said solid drain passage opening at its lower end to a lower section of the vessel below said sloping baffles, solid inlet means connecting into the upper section of said vessel above said sloping baffles, means above said sloping baffles to direct solid inlet flow into each vertical solid inlet passage adjacent the upper ends of the sloping passages in any vertical row and to substantially exclude direct vertical flow of solids between the portion of said vessel above said sloping baffles and any vertical solid outlet passage, members defining a passage for solid flow from each vertical solid inlet passage into each of said sloping passages and providing at the upper ends of each sloping passage a gas disengaging space communicating with said sloping passage but from which solid flow is diverted, means to withdraw gas from said gas disengaging spaces, means to introduce hydrocarbon reactant vapors into said vessel at locations adjacent the lower ends of each of said sloping passages, means to withdraw solid material from the lower section of said vessel below said sloping baffles and flow throttling means associated with said solid material withdrawal means.

11. An apparatus for conversion of gases in the presence of a contact mass material which comprises: a substantially vertical closed vessel, a vertical row of vertically spaced, parallel downwardly sloping baffles supported in the intermediate vertical section of said vessel and extending only partly across the vessel in one direction so as to provide continuous spaces, extending vertically adjacent both the upper and lower ends of the sloping baffles, the baffles thereby providing in the intermediate vertical section of the vessel a vertical row of superimposed parallel, downwardly sloping passages for solid flow having a common continuous vertical space extending adjacent the upper ends of said passages and a second common continuous vertical space extending adjacent the lower edges of said passages, a louvred vertical partition within said second vertical space extending along that portion of the vessel opposite said sloping baffles and being spaced horizontally from the lower edges of said sloping passages so as to provide a vertical gas inlet header space and a vertical solid drain passage between said header space and the lower edges of said sloping baffles, said drain passage opening to the lower section of said vessel below said sloping baffles, the louvres on said partition being such as to prevent solid particle flow therethrough while permitting free gas flow therethrough, a top closure across said gas inlet header space, means to introduce gas into said gas inlet header space, means defining a vertical solid inlet header passage positioned within said vertical space extending adjacent the upper ends of said sloping baffles, said passage defining means extending upwardly into the upper section of said vessel above said sloping baffles and being horizontally spaced from the upper edges of said sloping baffles so as to provide a continuous vertical gas outlet space between the upper edges of said baffles and said passage defining means, a bottom closure, to the vertical solid inlet manifold passage to prevent flow therefrom into the lower section of said vessel below said sloping baffles, short conduits connected at an angle into said passage defining means at the levels of the upper ends of each of said downwardly sloping passages, said conduits extending down into said sloping passages shortly below their upper ends thereby providing gas disengaging spaces at the upper ends of said sloping passages, which disengaging spaces communicate with the vertical gas outlet space extending between the upper edges of said sloping baffles and said vertical passage defining means, a partition extending across said vessel within the upper section thereof defining a solid inlet chamber spaced above said sloping baffles and providing between said partition and the uppermost sloping passage a gas outlet accumulation space which communicates with said vertical gas outlet space, means communicating the upper end of said solid inlet manifold passage with said solid inlet chamber, means to supply solid material to said solid inlet chamber, and means to withdraw solid material from the lower section of said vessel below said sloping baffles.

12. An apparatus for conversion of gases in the presence of a contact mass material which comprises: a substantially vertical closed vessel, a vertical row of vertically spaced, parallel downwardly sloping baffles supported in the intermediate vertical section of said vessel and extending only partly across the vessel in one direction so as to provide continuous spaces, extending vertically adjacent both the upper and lower ends of the sloping baffles, the baffles thereby providing in the intermediate vertical section of the vessel a vertical row of superposed parallel, downwardly sloping passages for solid flow having a common continuous vertical space extending adjacent the upper ends of said passages and a second common continuous vertical space extending adjacent the lower edges of said passages, and opening on its lower end to a lower section of said vessel below said sloping baffles, means to introduce gaseous feed into said second vertical space opposite the lower ends of each of said sloping passages, a transverse partition across the upper section of said vessel defining a solid feed inlet chamber a spaced distance above said sloping baffles, members defining a substantially vertical passage for solid flow from said solid feed inlet chamber extending downwardly within said vertical space adjacent the upper ends of said sloping passages, the passage for solid flow so defined occupying only a portion of the horizontal cross section of said vertical space and being so positioned as to leave a vertical gas outlet header passage communicating the upper ends of each of said sloping passages, said transverse partition and members defining said vertical passage for solid flow providing also a gas accumulation space in the portion of the vessel between said partition and the uppermost sloping baffle, said accumulation space communicating directly with said vertical gas outlet header passage, a gas outlet conduit connecting into said vessel at the level of said gas accumulation space, a closure on the lower end of said vertical passage for solid flow blocking it off from the lower section of said vessel below the sloping baffles, short conduits extending downwardly at an angle from said vertical solid flow passage into each of said sloping passages, said conduits terminating within the sloping passages shortly below their upper ends thereby providing gas disengaging spaces at the upper ends of said sloping passages, which disengaging spaces communicate with said vertical gas outlet header passage, an outlet conduit for withdrawal of solids from the lower section of said vessel below said sloping baffles and flow throttling means associated with said outlet conduit.

LOUIS P. EVANS.

REFERENCES CITED

The following references are of record in the file of this patent:

UNITED STATES PATENTS

| Number | Name | Date |
|---|---|---|
| 483,018 | Schaaf | Sept. 20, 1892 |
| 1,362,063 | Vezey et al. | Dec. 14, 1920 |
| 2,183,301 | Bossner et al. | Dec. 12, 1939 |

FOREIGN PATENTS

| Number | Country | Date |
|---|---|---|
| 22,815 Of 1904 | Great Britain | Nov. 24, 1904 |
| 457,430 | Germany | Mar. 16, 1928 |